United States Patent [19]

Anreiter

[11] Patent Number: 5,046,244

[45] Date of Patent: Sep. 10, 1991

[54] METHOD FOR MANUFACTURING STATORS, IN PARTICULAR EXTENDED STATORS, FOR PUMPS OR MOTORS WITH ECCENTRIC SHAFTS

[75] Inventor: Alois Anreiter, Schwanenstadt, Fed. Rep. of Germany

[73] Assignee: Linsinger Maschinenbau GmbH, Steyrermuhl, Austria

[21] Appl. No.: 465,676

[22] Filed: Jan. 16, 1990

[30] Foreign Application Priority Data

Jan. 31, 1989 [DE] Fed. Rep. of Germany ....... 3902740

[51] Int. Cl.$^5$ .............................................. B23P 15/00
[52] U.S. Cl. .................................. 29/888.02; 29/416; 29/425; 29/558; 29/888; 29/889
[58] Field of Search .................... 29/888, 888.02, 416, 29/425, 463, 557, 558, 889; 418/5

[56] References Cited

U.S. PATENT DOCUMENTS

| | | | |
|---|---|---|---|
| 1,708,115 | 4/1929 | Baldwin | 29/416 |
| 4,561,476 | 12/1985 | Bunkoczy | 29/416 |
| 4,585,401 | 4/1986 | Baldenko et al. | 29/888.02 |

FOREIGN PATENT DOCUMENTS

| | | | |
|---|---|---|---|
| 3615795 | 11/1987 | Fed. Rep. of Germany | 29/888.02 |
| 0072739 | 5/1982 | Japan | 29/416 |
| 0162384 | 9/1984 | Japan | 29/416 |
| 1466394 | 3/1977 | United Kingdom . | |

Primary Examiner—Irene Cuda
Attorney, Agent, or Firm—Browdy and Neimark

[57] ABSTRACT

Extended stators for pumps or motors with eccentric shafts are made by machining. These stators are provided in the direction of their long axis with a dual- or multi-thread inner bore profile having periodically repeated profile pitches of predetermined lead as interior stator work faces. The course of the following method steps are utilized: (a) partial segments of the inner bore profile are produced by means of machining on rod-like work pieces as exterior working surfaces; (b) the work pieces are then separated in the direction of their long axes into a predetermined number of partial work pieces in such a way that each partial work piece has a partial segment of the inner bore profile, and (c) these partial work pieces are subsequently assembled together in such a way that the partial segments are combined into a complete inner bore profile.

13 Claims, 4 Drawing Sheets ns have the disadvantage that in practice they can only be used within a limited temperature range, the respective temperature range being determined by the plastic material from which they are molded.

METHOD FOR MANUFACTURING STATORS, IN PARTICULAR EXTENDED STATORS, FOR PUMPS OR MOTORS WITH ECCENTRIC SHAFTS

FIELD OF THE INVENTION

The invention relates to a method for making stators for pumps or motors. The invention further relates to a device for executing the method of the invention.

BACKGROUND OF THE INVENTION

A known method for manufacturing stators for pumps or motors with eccentric shafts comprises, for example, manufacture by means of non-cutting formation of stators, and thus of their interior stator work face, from elastic rubber or from plastic. However, stators resulting from such manufacturing processes have the disadvantage that in practice they can only be used within a limited temperature range, the respective temperature range being determined by the plastic material from which they are molded.

Additionally, methods for manufacturing stators are known which make use of machining techniques, so that it is possible to manufacture stators, which are to be installed in particular in pumps or motors, which are usable at higher working temperatures.

Such known machining methods comprise, for example, so-called interior-off-center-contour-lathe methods, where the profile of the inner bore of the stator is created in the shape of interior, machined working surfaces, in particular with the aid of boring bars or turn-out rods. However, the working depth of such contour lathe methods is relatively limited, i.e. there is a length limitation for the resulting stators in accordance with the formula:

$$L \leq 15 D$$

where L is the length of the stator profile and D the diameter of the profile of the inner bore.

Thus, the known contour lathe methods only permit the manufacture of inner bore profiles having only a comparatively limited length which, of course, is considered to be quite disadvantageous in practice. Other disadvantages are unfavorable cutting conditions, slow working speeds, irregular machining, etc.

To overcome these difficulties, it has already been attempted in accordance with the state of the art to manufacture stators made of several individual short longitudinal pieces and subsequently to put these separate longitudinal pieces axially together, because in practice there is often eccentric shaft pumps of active pump length which sometimes needs to be several meters in order to make it possible to satisfy the requirement for certain pumping or output parameters. In connection with such a manufacturing method there is, however, a serious problem with working the transition faces of the inner bore profile of the stator, since these transition faces are hardly accessible to tools. The result of this is inexact fit, which causes reductions in tool life and output.

In this connection the inner stator impact surfaces which must be worked are particularly hard to reach so that in cases where such stators are intended to be manufactured by means of the customary machining technology it would be required to put the stator together out of a large number of relatively thin disks where the inner impact surfaces can be worked relatively well. However, such a method is very inefficient in practice because, as a rule, a large number of single work pieces must be individually worked and then these single work pieces must be assembled.

SUMMARY OF THE INVENTION

It is therefore an object of the invention to overcome deficiencies in the prior art such as indicated above and more particularly to provide an improved method for the manufacture of stators for pumps or motors with eccentric shafts by means of machining, so that with the aid of this new method it will be possible to machine even work pieces of relatively long dimensions with great exactness and so that such stators are made with a very high degree of efficiency, i.e. cost effectiveness.

The above objects are achieved in accordance with the invention in the course of the following method steps:

Partial segments of the inner bore profile to be formed for the stator are created as exterior working faces on rod-like work pieces by means of machining, the work pieces are then divided in the direction of their long axes into a predetermined number of partial work pieces in such a way that each partial work piece has a partial segment of the inner bore profile, and these partial work pieces are subsequently put together in such a way that the partial work pieces together form the complete inner bore profile of the stator.

This method in accordance with the invention has the particular advantage that all length limitations are practically omitted. Such a method can also be carried out considerably more economically than the methods in accordance with the state of the art, aside from the fact that the method in accordance with the invention shows excellent results in regard to the quality of the resultant inner stator work faces. In the final analysis this is of primary importance for the efficiency and the service life of pumps or motors with eccentric shafts in which the stators will be installed.

Beyond this, the method according to the invention also permits the manufacture in a relatively simple manner of stators with multiply threaded inner bore profiles. The term multiple threads refers in particular to profiles of more than two threads which, according to the state of the art, was either completely impossible or entailed extraordinary technical difficulties in their manufacture.

Furthermore, by means of the method according to the invention, particularly advantageous conditions are being created in regard to machining technology, which most of all assure high work speeds and simple finishing of the resultant products.

Finally, the inner stator work faces can be manufactured very precisely by machining, which is an important advantage of the method according to the invention, because these stator work faces constitute the rotor contact surfaces, i.e. for example in case of a pump with an eccentric shaft, for all practical purposes they are the pump work faces, where the achievement of a tight seal between stator and rotor is of extraordinary importance.

Further and very advantageous embodiments of the method are described below.

The present invention also relates to a method for the manufacture of pumps or motors with eccentric shafts including the use of stators manufactured by means of the method according to the invention, as well as by use of respective double- or triple-threaded rotors, where these stators and rotors are advantageously intended to have continuously changing leads over their respective lengths.

By means of the present invention it is now possible to fulfill a longstanding wish of pump manufacturers, because it is now possible to manufacture stators with varied leads, looking in the direction of their long axes, which can be combined with correspondingly constructed rotors.

Beyond this it is a further object of the present invention to provide an improved device for the manufacture of stators by machining, in particular extended stators for pumps or motors with eccentric shafts, in particular a device for executing the manufacturing method in accordance with the invention.

This device is characterized in accordance with the invention by the combination of the features including:

a. means for producing a predetermined number of partial segments of the inner bore profile of the stator to be formed as exterior working surfaces on rodlike work pieces by means of machining;

b. means for the subsequent separation of the worked work pieces in the direction of their long axes into a predetermined number of partial work pieces in such a way that each partial work piece has a partial segment of the inner bore profile of the stator; and c. means for assembling the partial work pieces in such a way that the partial segments combine into the complete inner bore profile of the stator.

Advantageous improvements of the device according to the invention are described below With the aid of the invention it is possible for the first time to manufacture by machining, without great effort in the field of control techniques, stators with an inner bore profile and of practically any length, preferably also stators with threaded inner bore profiles and/or with varied leads over the length of the profile pitch of the inner bore profile.

The device according to the invention is in particular distinguished by the simple structural means in respect to the layout of the whirl machine with the milling unit. The total design of this device in a simple and cost-effective manner is assured.

BRIEF DESCRIPTION OF DRAWING

Other objects and the nature and advantages of the present invention will be more apparent from the drawing and the following detailed description. Thus, the invention will be described below within the framework of exemplary embodiments by means of the drawing figures, wherein.

DETAILED DESCRIPTION OF EMBODIMENTS

Figure 1:
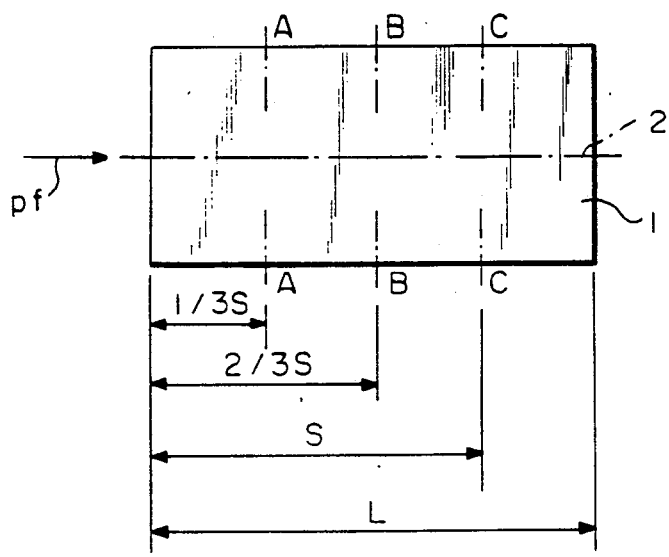
FIG. 1 is a schematic lateral view of a stator for pumps or motors with eccentric shafts.

Shown in FIG. 1 is a schematic lateral view of a stator 1 for a pump with eccentric shaft, this stator 1 having, in the direction of its profile long axis 2, a triple-threaded inner bore profile 14, the three periodically repeated profile pitches 15 of which can be seen in detail in FIG. 2. The length of this stator 1 and thus also of its inner bore profile 14 is designated by the letter L in FIG. 1.

It can furthermore be seen from FIGS. 1 and 2 that the profile pitches 15 of the stator 1 have a pre-set lead S.

Figure 2D:
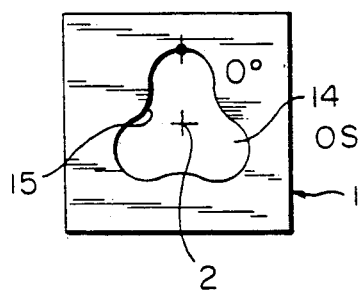
FIG. 2D is a front view of the stator in accordance with FIG. 1 in the direction of the arrow Pf.

FIG. 2D is a frontal view of the stator 1 in the direction of the arrow Pf in accordance with FIG. 1, where the cross section of the inner bore profile 14 located in this plane and defined by the position 0° corresponding to the start of the inner bore profile 14 is marked by the term "0 S".

Figure 2A:
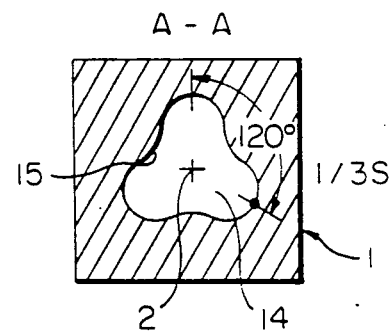
FIGS. 2A–2C are three successive sectional views of the stator in the planes A—A, B—B and C—C in accordance with FIG. 1.

FIG. 2A is a sectional view in the plane A—A in accordance with FIG. 1, where now the cross section of the inner bore profile 14 is shown after having been turned 120° corresponding to a first phase of the lead of "⅓ S".

Figure 2B:
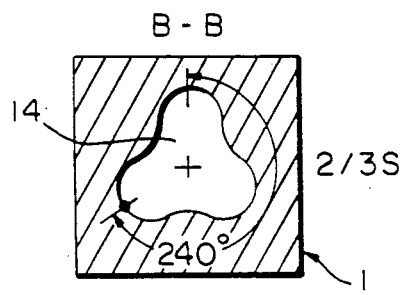

FIG. 2B is a sectional view through the stator 1 in the plane B—B in accordance with FIG. 1 showing the cross section of the inner bore profile 14 which has been turned by 240°, corresponding to a lead phase of "⅔ S" which has now been attained.

Figure 2C:
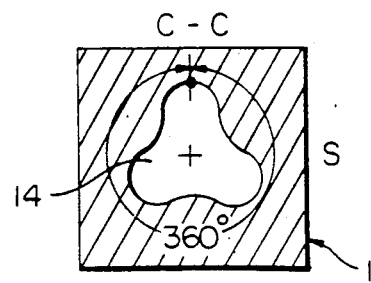

Finally, FIG. 2C is a sectional view in the plane C—C according to FIG. 1, where now the cross section of the inner bore profile 14 is shown in its phase of complete turning around 360°, i.e. the inner bore profile 14 is now characterized in this position by the completely attained lead "S".

The profile pitches 15 of the inner bore profile 14 constitute the interior stator work faces which cooperate in the form of contact surfaces with surfaces of a corresponding rotor, not illustrated here, of the pump with an eccentric shaft.

In practice the number of the threads of the inner bore profile 14 may preferably be between two and twelve; however, in principle n threads are conceivable.

By means of FIGS. 3 to 5 the principle of the method in accordance with the invention for manufacturing a stator with a double-thread inner bore profile will now be described, the cross section of which can be seen in FIG. 5.

Figure 3:
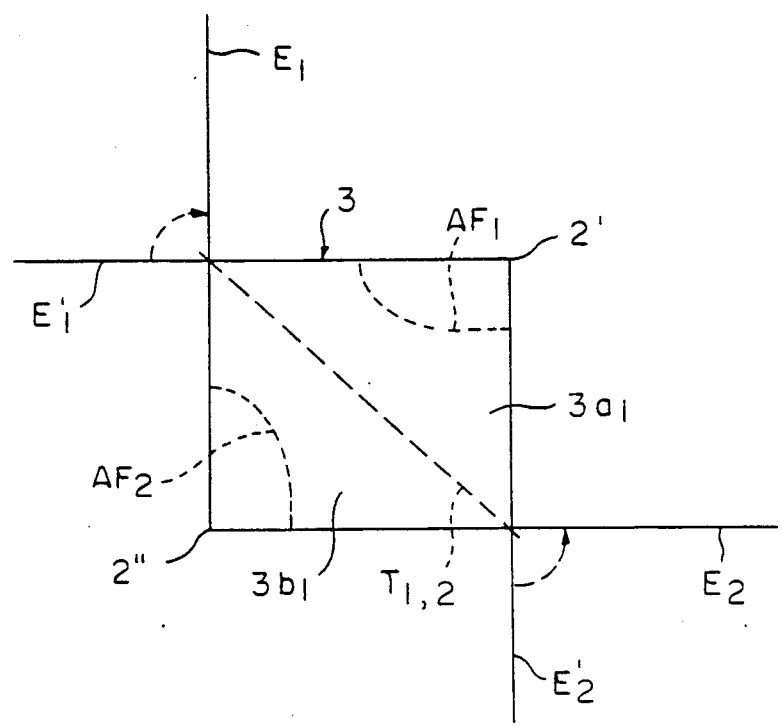
FIG. 3 is a schematic view of a square cross-sectional surface of a rod-like work piece which is to be worked in accordance with the method of the invention.
Figure 4:
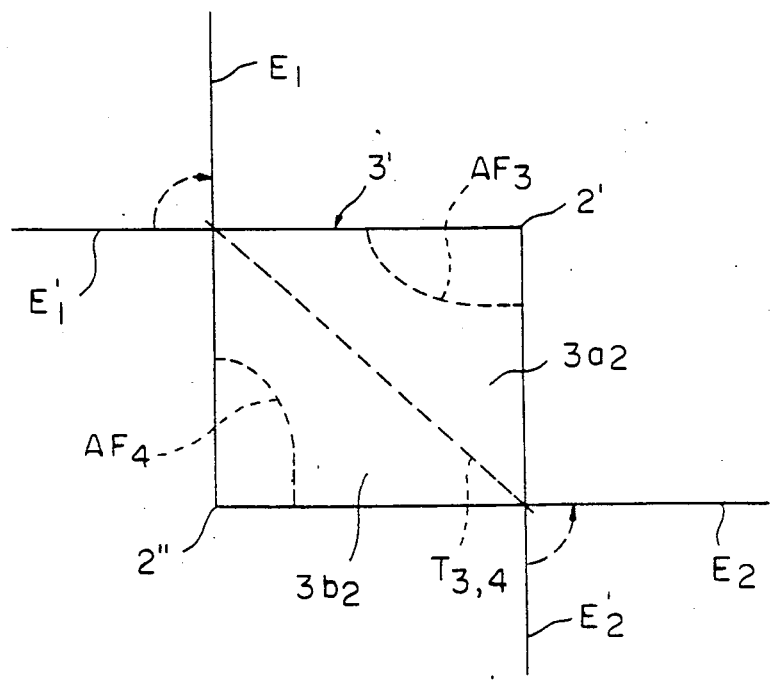
FIG. 4 is a view corresponding to FIG. 3 of a further work piece or its square cross-sectional surface.

Initially it is assumed that for the manufacturing method oblong, rod-like work pieces 3, 3′. each having a square cross section, are being provided, such as can be seen in detail in FIGS. 3 and 4. These work pieces 3, 3′ are subjected to machining in accordance with the method of the invention.

In accordance with FIG. 3, initially partial segments of the inner bore profile 14 in accordance with FIG. 3 to be formed are made as exterior working surfaces $AF_1$ and $AF_2$ on the work piece 3, these partial segments being formed on surface areas or edge areas of the work piece 3 which are located opposite each other. A work piece 3' in accordance with FIG. 4 is machined in a corresponding manner, i.e. partial segments of the inner bore profile 14 are also made on this work piece 3' as exterior working surfaces $AF_3$ and $AF_4$. Machining of the work pieces 3 and 3' is performed by means of a profiling cutter in a whirl machine, such as described in more detail below by means of FIGS. 7 and 8.

After all partial segments $AF_1$ to $AF_4$ have been completed on both work pieces 3 and 3', first the work piece 3 in accordance with FIG. 3 is separated in the direction of its long axis into two equal, symmetrical partial work pieces $3a_1$ and $3b_1$. In a corresponding manner the work piece 3' in accordance with FIG. 4 is also separated in the direction of its long axis into two equal partial work pieces $3a_2$ and $3b_2$ which are symmetrical in respect to each other.

These respective separations of the work pieces are made in accordance with set parting planes $T_{1,2}$ (FIG. 3) and $T_{3,4}$, (FIG. 4), these parting planes also each extending in the direction of the long axis of the work pieces 3, 3'.

These parting planes $T_{1,2}$ and $T_{3,4}$ are in particular diagonally extending planes in the area between those work pieces which are not intended to be machined, i.e. on which no partial segments of the inner bore profile are made.

Figure 5:
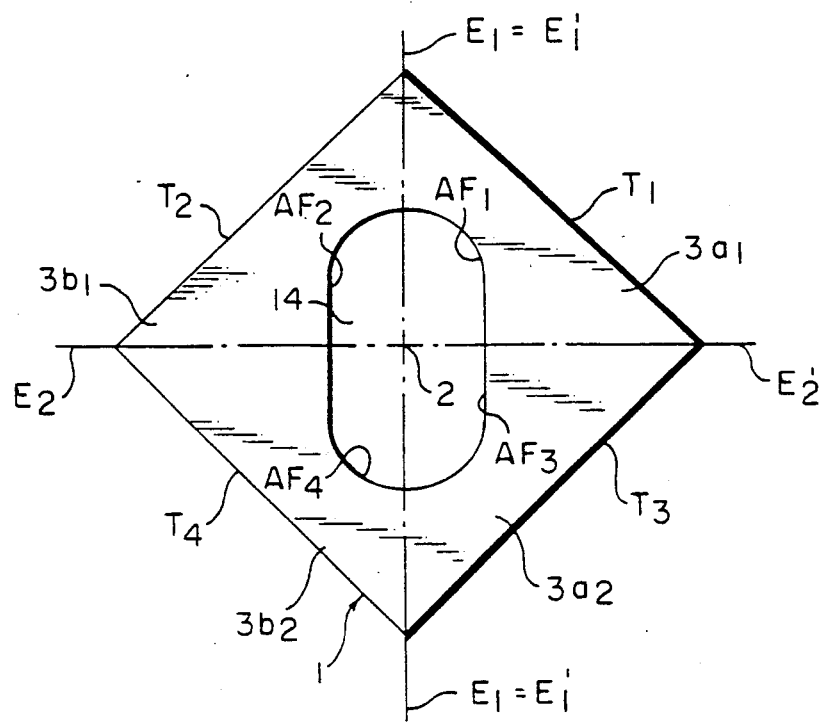
FIG. 5 is a schematic front view of a stator manufactured in accordance with the method of the invention.

As a result of these separations of the work pieces 3 and 3' in accordance with the respective parting planes $T_{1,2}$ and $T_{3,4}$ a total of four partial work pieces $3a_1$, $3b_1$, $3a_2$ and $3b_2$ are made out of the machined work pieces, each individual partial work piece having a partial segment of the inner bore profile 14 in accordance with FIG. 5, i.e. the partial work piece $3a_1$ has the partial segment $AF_1$, the partial work piece $3b_1$ the partial segment $AF_2$, the partial work piece $3a_2$ the partial segment $AF_3$ and finally the partial work piece $3b_2$ the partial segment $AF_4$. In a subsequent method step the partial work pieces described above are assembled in such a way that the stator 1, shown in FIG. 5, results, in which now the partial segments have been combined into its complete inner bore profile 14.

The method step of assembly is particularly performed in a way where the planes in which each of the original four exterior surfaces of the work pieces 3 and 3' are located and which are designated in FIGS. 3 and 4 by a first plane $E_1$, a second plane $E'_1$ extending vertically to it, a third plane $E_2$ extending parallel to it and finally a fourth plane $E'_2$, extending vertically to the latter, now constitute the planes of mutual assembly of the four partial work pieces $3a_1$, $3b_1$, $3a_2$ and $3b_2$, as can be seen in FIG. 5. In this assembled state of the stator 1 the first plane $E_1$ is identical to the second plane $E'_1$, i.e. they now together form a common plane, and in a corresponding manner the third and fourth planes $E_2$ and $E'_2$ now form a common plane. The planes $E_1$, $E'_1$ and $E_2$, $E'_2$ intersect in the resulting long profile axis 2 of the inner bore profile 14 of the stator 1. Thus the original, outer longitudinal edges 2' and 2" of the work pieces 3 and 3' now are each located at opposite areas of the edge, where the partial segments $AF_1$ to $AF_4$ are then created, quasi coinciding in the long profile axis 2 of the completed stator 1.

At the same time the original parting planes of the two work pieces 3 and 3' form the outside surfaces of the stator 1 with a square cross section in such a way that now the first parting plane $T_1$ becomes the outer surface of the first partial work piece $3a_1$, the second parting plane $T_2$ the outer surface of the second partial work piece $3b_1$, the third parting plane $T_3$ the outer surface of the third partial work piece $3a_2$ and finally the fourth parting plane $t_4$ the surface of the fourth partial work piece $3b_2$.

The method step of assembling the partial work pieces into the completed stator 1 in accordance with FIG. 5 is completed, although not shown in detail here, by mechanically clamping the partial work pieces $3a_1$, $3b_2$, $3a_2$ and $3b_1$ at the surfaces where they abut, i.e. in the respective planes $E_1$, $E'_1$, $E_2$ and $E'_2$, for example with the aid of a suitable positioning tang, and by the subsequent interconnection of these partial work pieces, preferably by way of a separable connection, perhaps by means of screwing them together.

In any case, the result in accordance with FIG. 5 is the complete inner bore profile 14 of the stator 1 made from the individual partial segments $AF_1$ to $AF_4$, which had been made in the form of exterior working surfaces during the first method step.

Figure 6:
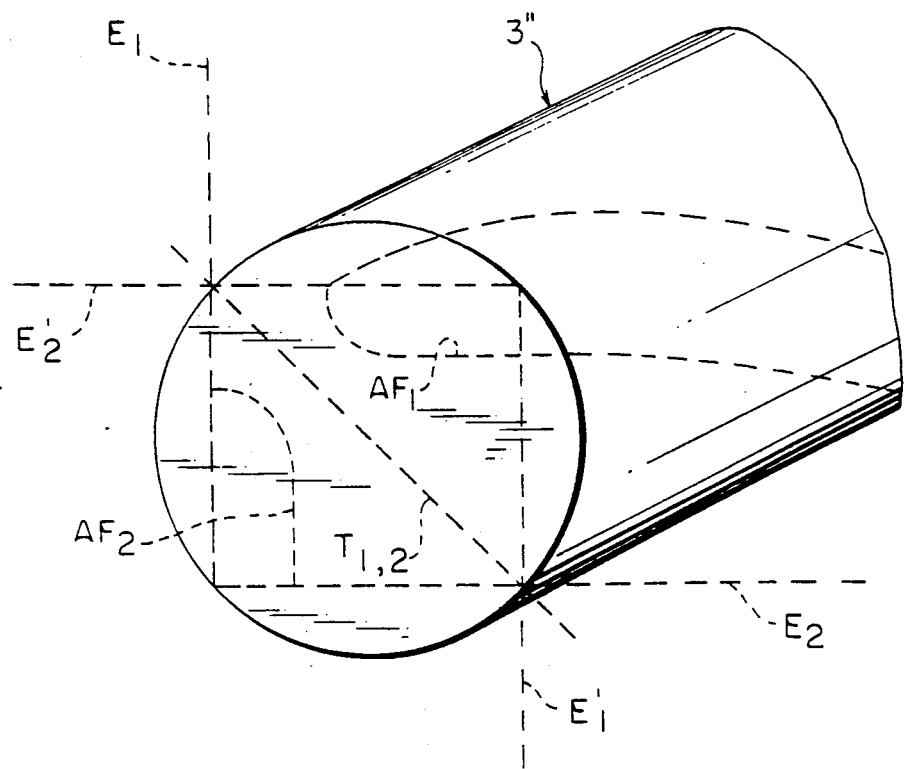
FIG. 6 is a further exemplary embodiment of a work piece which is to be subjected to machining for the purpose of manufacturing a stator in accordance with the method of the invention, this work piece here having primarily a circular cross section.

While it was required above that oblong rod-like work pieces with a square cross section were the basis for machining, there is also the alternative possibility to mainly machine work pieces with circular or quasi-circular cross sections, such as is described in an exemplary manner by means of FIG. 6.

FIG. 6 is a schematic view of a partial section of a rodlike work piece 3" from which, in a manner corresponding to the description of FIGS. 3 and 4, partial segments of the inner bore profile of the stator to be made are created as exterior working surfaces. However, in every case it is also necessary that at the same time, or following the manufacture of these partial segments $AF_1$, etc., further ablating machining operations performed with the aim to make each of the remaining exterior surfaces of the work piece 3" level, as indicated by dashed lines in FIG. 6.

Thus it is again required to provide exterior surfaces of the work piece 3" which, corresponding to the work pieces 3 and 3' with originally square cross section in accordance with FIG. 3 and 4, also are each located in the planes $E_1$, $E'_1$, $E_2$ and $E'_2$, such as is also indicated in FIG. 6.

The subsequent, further work steps are the same as those already described in detail above by means of FIGS. 3 to 5.

Making reference to FIG. 5 it is also pointed out that there is the supplementary possibility within the scope of the method in accordance with the invention, following the assembly of, for example three partial work pieces $3a_1$, $3b_1$ and $3a_2$ and by first omitting the fourth partial work piece $3b_2$, to finish the freely accessible partial stator work surface of the inner bore profile 14, formed by the three partial segments $AF_1$, $AF_2$ and $AF_3$, over its entire length, this finishing step constituting a finish of the surface of the interior stator work surface. In a corresponding manner its is, of course, also possible to perform such a finish of the surface after assembling only two partial work pieces, so that on the one hand the partial segments $AF_1$ and $AF_3$ of the stator work surface are finished and, on the other, also the partial segments $AF_2$ and $AF_4$, as long as the associated partial work pieces have been assembled.

To manufacture a complete pump with an eccentric shaft or motor with an eccentric shaft, for example by use of a stator in accordance with FIG. 5 (it is understood that a corresponding single-thread rotor is also part of this), it is possible to proceed in a manner where the individual partial work pieces $3a_1$, $3b_1$, $3a_2$ and $3b_2$, together with the partial segments $AF_1$ to $AF_4$ formed on them, of the inner bore profile 14 are placed around the associated rotor and are closed in the manner of shells.

Subsequently the required, preferably removable connections of the individual partial work pieces are provided.

Figure 7:
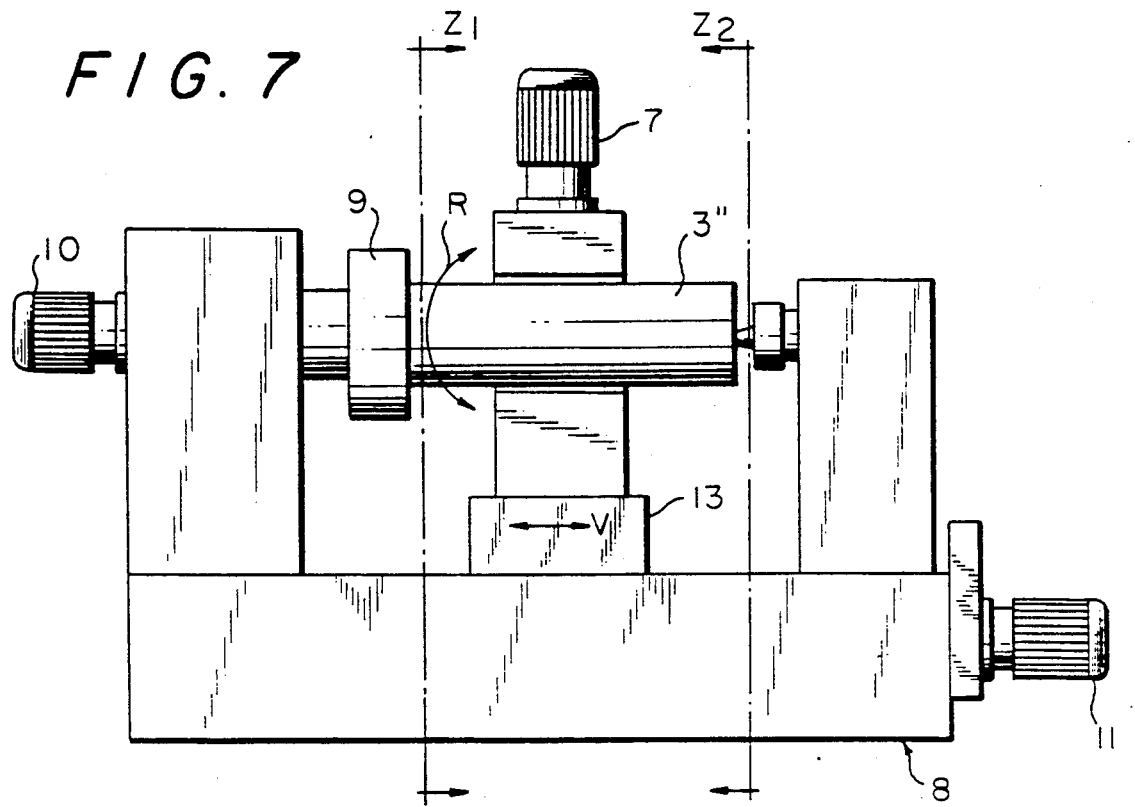
FIG. 7 is a schematic lateral view of a device for manufacturing stators for pumps or motors with eccentric shafts by means of machining.
Figure 8:
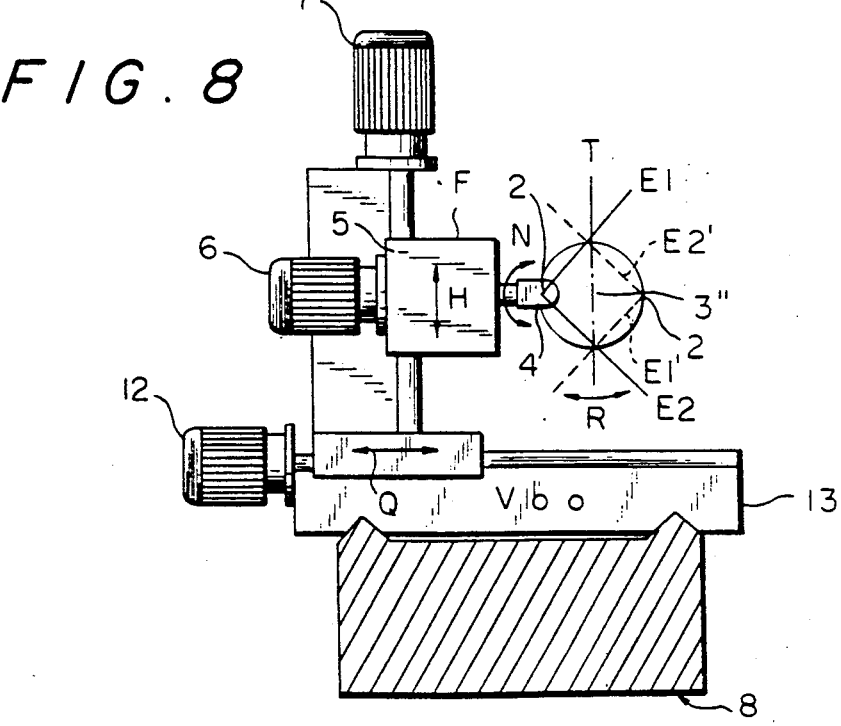
FIG. 8 is a view of the device in accordance with FIG. 7 in the area between the two vertical planes $Z_1$ and $Z_2$ according to FIG. 7.

In FIGS. 7 and 8 an exemplary embodiment of a whirl machine is shown which is constructed and designed in such a way that by its use the machining of rod-like work pieces can be performed in accordance with the method of the invention for manufacturing stators for pumps or motors with eccentric shafts.

It is assumed that it is intended to work an oblong work piece 3" in accordance with FIG. 6 with an initially circular cross section. Instead, however, this could also be work pieces 3 or 3' in accordance with FIGS. 3 or 4.

The whirl machine 8 has a rotatably supported work spindle 9, drivable by means of a motor 10, which is used for coaxial clamping of the work piece 3" in a fixed relationship to a milling unit F.

This milling unit F is equipped with a profiling cutter in the form of an end-milling cutter and is supported by a longitudinal carriage 13.

The milling unit F with the profiling cutter 4 is furthermore connected with a drive motor 6, by means of which the profiling cutter 4 can be put into rotational movement at N rpm in order to work the rod-like work piece 3".

Furthermore, a feed motor 11 is provided for the longitudinal carriage 13 supporting the milling unit F in order to produce feed movements V of the longitudinal carriage 13 in relation to the drive spindle 9. The longitudinal carriage 13 is connected to an adjusting motor 12, by means of which it is possible to generate crosswise movements Q of the longitudinal carriage 13 in relation to the work spindle 9.

Additionally, an adjusting motor 7 cooperating with an adjusting carriage 5 is provided, which is used to create elevational movements H of the milling unit F, mounted on the adjusting carriage 5, in relation to the work spindle 9.

The mode of operation of the whirl machine 8 in accordance with FIGS. 7 and 8 is as follows:

As soon as the work piece 3" has been clamped on the work spindle 9, the latter is put into rotation R by the motor 10. The speed of rotation of the work spindle 9 can be exactly matched with the feed movements V of the longitudinal carriage 13, which is moved in a horizontal direction by means of the feed motor 11. In order to create the partial segments of an inner bore profile in the form of exterior working surfaces $AF_1$ to $AF_4$ of the work piece 3", as has already been described above, the profiling cutter 4, preferably in the form of an end-milling cutter, of the milling unit F is activated and is driven by the drive motor 6 in rotational movements at N rpm.

The profile of this profiling cutter 4 is laid out in a lead-distorted manner in regard to the profile leads 15 of the inner bore profile 14 of the stator 1 which are to be produced (see FIG. 5).

The machining of the work piece 3" takes place in the manner already described above.

In particular, in this case working of the exterior working surfaces $AF_1$ to $AF_4$ at the work piece 3" takes place with a five-times superimposed relative movement between the work piece 3" and the profiling cutter 4, the profiling cutter 4 rotating at N rpm, creating the profile of the profile pitches 15. The distance of the profile pitches from the resulting long profile axis 2 is characterized by a constant value. By means of a matching rotation R of the work spindle 9 with the work piece 3" in relation to the elevational movements H of the milling unit F, as well as in relation to the crosswise movements Q and the feed movements V of the longitudinal carriage 13, the partial segments of the inner bore profile 14 of the stator are created as exterior working surfaces. For the control of the above described elevational movements H, crosswise movements Q and feed movements V, control devices, not shown in detail, are provided, which cooperate with the adjusting motor 7, the feed motor 11 and the adjusting motor 12.

The rotation R of the work spindle 9, the feed movement V of the longitudinal carriage 13 as well as the crosswise movement Q are, per se, customary functions of a whirl machine.

In accordance with a variant of the device described above, it is also possible to use other machining technologies for creating the exterior working surfaces on the work piece 3", such as CNC milling, so that, for example, the whirl machine 8 may also be equipped with a CNC milling unit, which is not shown in detail in FIGS. 7 and 8.

Again it is pointed out that it is possible to achieve particularly advantageous features by means of the invention in the course of manufacturing, in particular extended stators with varied leads, there being a simple possibility to realize this by means of changes of the controlled proportions of the movements.

Furthermore, it is possible in the course of manufacturing multi-thread stators to perform the working of the initial work pieces under extraordinarily advantageous conditions of machining technology.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method for the manufacture of an extended stator for devices with eccentric shafts, where the stator is provided with multi-thread inner bore profile in the direction of its long axis, and said stator has interior work faces periodically repeated profile pitches of predetermined lead, the improvement comprising the steps of:

machining rod-like work pieces (3, 3', 3") which are partial segments of an inner bore profile (14) of the stator (1) and which are machined in the form of exterior working surfaces ($AF_1$, $AF_2$, $AF_3$, $AF_4$);
   separating said work pieces (3, 3', 3") in the direction of their long axes into a predetermined number of partial work pieces ($3a_1$, $3b_1$, $3a_2$ and $3b_2$) wherein each partial work piece has a partial segment of the inner bore profile (14); and assembling said partial work pieces ($3a_1$, $3b_1$, $3a_2$ and $3b_2$) to combine the partial segments into the complete inner bore profile (14).

2. A method in accordance with claim 1, further comprising the step of producing at least two partial segments ($AF_1$, $AF_2$, or $AF_3$, $AF_4$) of the inner bore profile (14) on each work piece (3, 3′).

3. A method in accordance with claim 1, wherein in said work pieces (3, 3′) have square cross sections.

4. A method in accordance with claim 3, wherein a partial segment ($AF_1$, $AF_2$, or $AF_3$, $AF_4$) is produced on the diametrically opposite edge areas of the work piece (3, 3′).

5. A method in accordance with claim 1 wherein the work piece (3 or 3′) is separated in accordance with at least one parting plane ($T_{1,2}$ or $T_{3,4}$), extending along a long axis of the work piece, for the formation of partial work pieces ($3a_1$, $3b_1$, or $3a_2$, $3b_2$).

6. A method in accordance with claim 5, wherein diagonally extending planes between longitudinal edges of work pieces are created and are used as parting planes ($T_{1,2}$ or $T_{3,4}$).

7. A method in accordance with claim 1, wherein the step of assembling the separated partial work pieces ($3a_1$, $3b_1$, $3a_2$, $3b_2$) into a complete stator (1), comprises assembling the planes ($E_1$, $E'_1$, $E_2$, $E'_2$) in which the original exterior surfaces of the work piece (3, 3′) extend, thereby forming the planes of the mutual assembly of the partial work pieces, and wherein all planes ($E_1$, $E'_1$, $E_2$, $E'_2$) intersect in the long profile axis (2) of the resultant inner bore profile (14) of the stator (1)).

8. A method in accordance with claim 1, wherein said workpieces (3″) have a circular or quasicircular cross-section.

9. A method in accordance with claim 8, further comprising the step of forming by cutting the remaining outer surfaces of the work piece (3″) which surfaces are located in planes ($E_1$, $E'_1$, $E_2$, $E'_2$).

10. A method in accordance with claim 1, further comprising the step of cutting of the work pieces (3, 3′, 3″) by means of a profiling cutter (4) of a whirl machine (8) for producing partial segments in the form of exterior working surfaces ($AF_1$ to $AF_4$) of the work pieces (3, 3′, 3″).

11. A method in accordance with claim 7, further including the steps of:

assembling partial work pieces ($3a_1$, $3b_1$, $3a_2$, $3b_2$);

forming a complete stator (1) with an inner bore profile (14); and mechanically clamping the work pieces at the surfaces where they adjoin and which are defined by the planes ($E_1$, $E'_1$, $E_2$, $E'_2$).

12. A method in accordance with claim 11, wherein after assembling at least two partial work pieces (e.g. $3a_1$, $3b_1$) and initially omitting at least one further or a third partial work piece (e.g. $3a_2$), finishing the entire length the partial stator work surface (rotor contact surface) of the inner bore profile (14) formed by the partial segments ($AF_1$, $AF_2$).

13. A method for manufacturing a device having an eccentric shaft which uses a stator having a continuously varying lead over its length comprising the steps of:

machining rod-like work pieces (3, 3′, 3″) which are partial segments of an inner bore profile (14) of the stator (1) and which are machined in the form of exterior working surfaces ($AF_1$, $AF_2$, $AF_3$, $AF_4$);

separating said work pieces (3, 3′, 3″) in the direction of their long axes into a predetermined number of partial work pieces ($3a_1$, $3b_1$, $3a_2$ and $3b_2$) wherein each partial work piece has a partial segment of the inner bore profile (14); and assembling said partial work pieces ($ea_1$, $3b_1$, $3a_2$ and $3b_2$) to combine the partial segments into the complete inner bore profile (14);

placing individual partial work pieces ($3a_1$, $3b_1$, $3a_2$, $3b_2$) with the partial segments ($AF_1$ to $AF_2$) of the resultant inner bore profile (14) of the stator (1) around the associated rotor in the form of a shell, and releasing the individual partial work pieces.

* * * * *